United States Patent
Ormsbee et al.

(10) Patent No.: US 12,550,870 B2
(45) Date of Patent: Feb. 17, 2026

(54) SYSTEMS AND METHODS FOR A LIGHTED ANIMAL RESTRAINT

(71) Applicant: Nite Ize, Inc., Boulder, CO (US)

(72) Inventors: Bowden Ormsbee, Longmont, CO (US); Dale Karacostas, Boulder, CO (US); Leo Lesperance, Erie, CO (US)

(73) Assignee: Nite Ize, Inc., Boulder, CO (US)

( * ) Notice: Subject to any disclaimer, the term of this patent is extended or adjusted under 35 U.S.C. 154(b) by 98 days.

(21) Appl. No.: 16/687,306

(22) Filed: Nov. 18, 2019

(65) Prior Publication Data

US 2021/0144970 A1    May 20, 2021

(51) Int. Cl.
*A01K 27/00* (2006.01)
*F21V 8/00* (2006.01)

(52) U.S. Cl.
CPC .......... *A01K 27/006* (2013.01); *A01K 27/001* (2013.01); *A01K 27/003* (2013.01); *G02B 6/001* (2013.01)

(58) Field of Classification Search
CPC .. A01K 27/006; A01K 27/001; A01K 27/003; A01K 27/00
See application file for complete search history.

(56) References Cited

U.S. PATENT DOCUMENTS

| | | | | |
|---|---|---|---|---|
| 3,641,333 A | * | 2/1972 | Gendron | A41F 9/002 362/108 |
| 3,935,443 A | * | 1/1976 | Simmons | A01K 27/006 362/108 |
| 4,167,156 A | * | 9/1979 | Kupperman | A01K 27/006 119/795 |
| 4,170,399 A | | 10/1979 | Hansen et al. | |
| 4,173,201 A | * | 11/1979 | Chao | A01K 27/006 D30/152 |
| 4,909,189 A | * | 3/1990 | Minotti | A01K 27/006 119/859 |
| 5,151,678 A | * | 9/1992 | Veltri | H05B 33/12 340/321 |

(Continued)

FOREIGN PATENT DOCUMENTS

| | | |
|---|---|---|
| CN | 201213400 Y | 4/2009 |
| CN | 208191835 U | 12/2018 |

OTHER PUBLICATIONS

International Search Report and Written Opinion dated Feb. 5, 2021 issued in PCT App. No. PCT/US20/60745 (10 pages).

(Continued)

*Primary Examiner* — Magdalena Topolski
*Assistant Examiner* — Edgar Reyes
(74) *Attorney, Agent, or Firm* — Haynes & Boone, LLP

(57) ABSTRACT

An animal restraint is either a leash or a collar. The animal restraint includes a lighting module and a circuit board, the circuit board enclosed in the lighting module. The animal restraint further includes a first light source connected to the circuit board, such that the first light source does not have a fixed position in relation to the circuit board, the first light source enclosed in the lighting module. The animal restraint further includes a fiber optic connected to and receiving light from the first light source, the fiber optic at least partially in the lighting module. The animal restraint further includes a first flat strap, the fiber optic surrounded by the first flat strap.

21 Claims, 11 Drawing Sheets

(56) References Cited

U.S. PATENT DOCUMENTS

| | | | | |
|---|---|---|---|---|
| 5,630,382 A * | 5/1997 | Barbera | ............... | A01K 27/006 |
| | | | | 119/859 |
| 5,950,571 A * | 9/1999 | Schade | ............... | A01K 27/006 |
| | | | | 119/908 |
| 6,059,414 A * | 5/2000 | Tsai | ....................... | G08B 5/004 |
| | | | | 362/108 |
| 6,170,959 B1 * | 1/2001 | Richardson, III | ..... | G08B 5/004 |
| | | | | 362/108 |
| 6,557,498 B1 * | 5/2003 | Smierciak | ............ | A01K 27/006 |
| | | | | 119/858 |
| 6,877,889 B2 * | 4/2005 | Peng | ................... | A01K 27/006 |
| | | | | 119/859 |
| 7,448,766 B1 * | 11/2008 | Lee | ........................ | A41F 9/002 |
| | | | | 362/108 |
| 8,926,154 B1 * | 1/2015 | Brauser | ..................... | F21S 4/24 |
| | | | | 362/570 |
| 9,775,328 B1 * | 10/2017 | Fidrych | ................ | A01K 27/002 |
| 10,772,302 B2 * | 9/2020 | Lutz | .................... | A01K 27/001 |
| 2003/0074720 A1 * | 4/2003 | Reed | ........................ | A41F 9/002 |
| | | | | 2/322 |
| 2003/0094145 A1 * | 5/2003 | Cheng | .................. | A01K 27/006 |
| | | | | 119/859 |
| 2007/0291473 A1 * | 12/2007 | Traynor | .................. | A41D 13/01 |
| | | | | 362/225 |
| 2008/0168952 A1 * | 7/2008 | Morehead | ........... | A01K 27/006 |
| | | | | 119/859 |
| 2015/0177455 A1 * | 6/2015 | Chou | ........................ | F21L 4/08 |
| | | | | 362/551 |
| 2016/0235039 A1 * | 8/2016 | Beal | ...................... | A01K 27/004 |
| 2017/0181508 A1 * | 6/2017 | Pemberton | ............ | A45C 11/00 |
| 2017/0347631 A1 * | 12/2017 | Dolan | .................. | A01K 27/003 |
| 2018/0125037 A1 * | 5/2018 | Osher | ................. | F21V 23/0435 |
| 2018/0125265 A1 | 5/2018 | Osher et al. | | |
| 2018/0288974 A1 | 10/2018 | Luz et al. | | |

OTHER PUBLICATIONS

Office Action dated Feb. 8, 2023 issued in co-pending Chinese Patent Application No. 202080092064.2 (18 pages with English translation).

Second Office Action from related application 2020800920642 dated Aug. 21, 2023.

* cited by examiner

SYSTEMS AND METHODS FOR A LIGHTED ANIMAL RESTRAINT

BACKGROUND

Visibility is an important safety measure for many animal owners. Animals, such as dogs, often take walks at night and it is valuable to have an illumination feature on the animal in order to improve its visibility. It is important that this illumination not be too bright however, since this can affect the night vision of the dog and the person accompanying the dog. At the same time, if the illumination area is too small, and the light level is too low, the animal will not be visible. Additionally, it is important for the lighting device not to be too heavy or bulky and have few durable parts.

BRIEF SUMMARY

In one embodiment, an animal restraint includes a lighting module and a fiber optic connected to and receiving light from the lighting module. The animal restraint further includes a first flat strap, the fiber optic surrounded by the first flat strap. In one alternative, the animal restraint is a leash. In another alternative, the animal restraint is a collar. Alternatively, the first flat strap is a tube and the animal restraint includes a second flat strap, the second flat strap along the length of the first flat strap, such that at least a portion of the fiber optic is sandwiched into a first pocket between the first flat strap and the second flat strap. In one alternative, the animal restraint further includes a second flat strap, the second flat strap along the length of the first flat strap, such that at least a portion of the fiber optic is sandwiched into a first pocket between the first flat strap and the second flat strap. Alternatively, the fiber optic has a u-shape and is aligned along a first and second long edge of the first flat strap. In another alternative, the fiber optic receives light from the lighting module at both ends of the fiber optic. Alternatively, a first light source is located at a first end of the fiber optic and a second light source is located at a second end of the fiber optic. In another alternative, the first light source and the second light source are LEDs. Alternatively, the first end of the fiber optic is immediately adjacent to the first light source and the first light source and the first end of the fiber optic are connected. In another alternative, the first light source and the first end of the fiber optic are taped together. Alternatively, the first light source is connected to a power source via wires. In another alternative, the first light source is connected to a circuit board via wires. Alternatively, the wires and the first and second light source are located in the lighting module. In another alternative, the lighting module is substantially enclosed.

In another embodiment, an animal restraint is either a leash or a collar. The animal restraint includes a lighting module and a circuit board, the circuit board enclosed in the lighting module. The animal restraint further includes a first light source connected to the circuit board, such that the first light source does not have a fixed position in relation to the circuit board, the first light source enclosed in the lighting module. The animal restraint further includes a fiber optic connected to and receiving light from the first light source, the fiber optic at least partially in the lighting module. The animal restraint further includes a first flat strap, the fiber optic surrounded by the first flat strap. In one alternative, the first flat strap is a tube and the animal restraint further includes a second flat strap, the second flat strap along the length of the first flat strap, such that at least a portion of the fiber optic is sandwiched into a first pocket between the first flat strap and the second flat strap. In one alternative, the animal restraint further includes a second flat strap, the second flat strap along the length of the first flat strap, such that at least a portion of the fiber optic is sandwiched into a first pocket between the first flat strap and the second flat strap. In another alternative, the fiber optic has a u-shape and is aligned along a first and second long edge of the first flat strap. Alternatively, fiber optic receives light from the lighting module at both ends of the fiber optic.

In one embodiment, a method of lighting an animal restraint includes providing an animal restraint, the animal restraint. The animal restraint includes a lighting module and a circuit board, the circuit board enclosed in the lighting module. The animal restraint includes a first light source connected to the circuit board, such that the first light source does not have a fixed position in relation to the circuit board, the first light source enclosed in the lighting module. The animal restraint includes a fiber optic connected to and receiving light from the first light source, the fiber optic at least partially in the lighting module. The animal restraint further includes a first flat strap, the fiber optic surrounded by the first flat strap. The method further includes activating the first light source. The method further includes transmitting light through the fiber optic. The method further includes emitting light through the first flat strap.

DETAILED DESCRIPTION

Certain terminology is used herein for convenience only and is not to be taken as a limitation on the embodiments of the systems and methods for a lighted animal restraint. In the embodiments shown, the lighted animal restraint comes in two basic forms. The first form is that of a collar and the second form is that of a leash. Although these two forms are shown, the principles of the lighted animal restraint may be applied to various harnesses, restraints, collars, or other types of restraints that attach on or to an animal. Generally, the lighted animal restraints are discussed in relation to dogs, however they may be applied to a variety of animals in a variety of contexts. In many embodiments, a lighted animal restraint includes a webbing or flat strap portion, a lighting module, and a fiber optic located in the webbing. In many embodiments, the fiber optic is held in the edge of a webbing portion, by putting a first webbing around the fiber optic and then sewing a central piece of webbing to the first webbing, the central piece of webbing being narrower than the first webbing, such that the fiber optic is trapped between the first webbing and the stitching and central piece of webbing.

Figure 1:
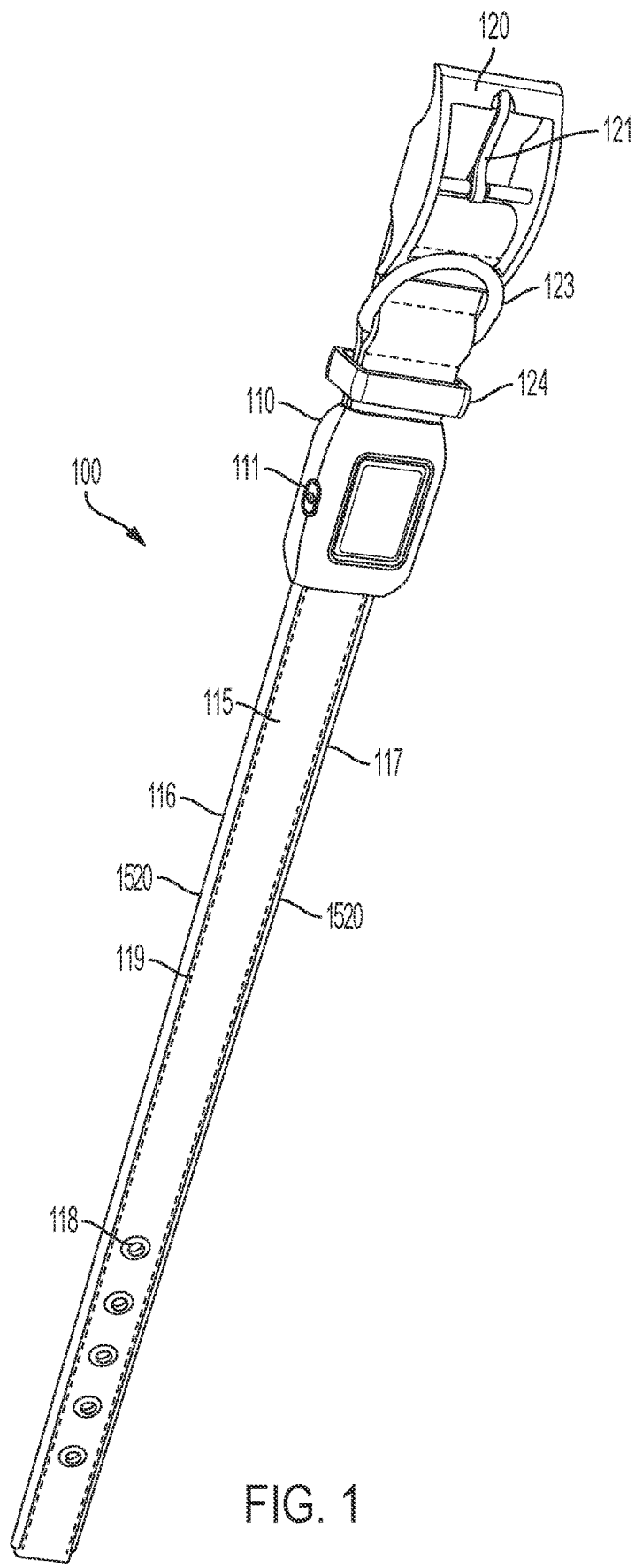
FIG. 1 shows one embodiment of a lighted animal restraint.
Figures 2, 3:
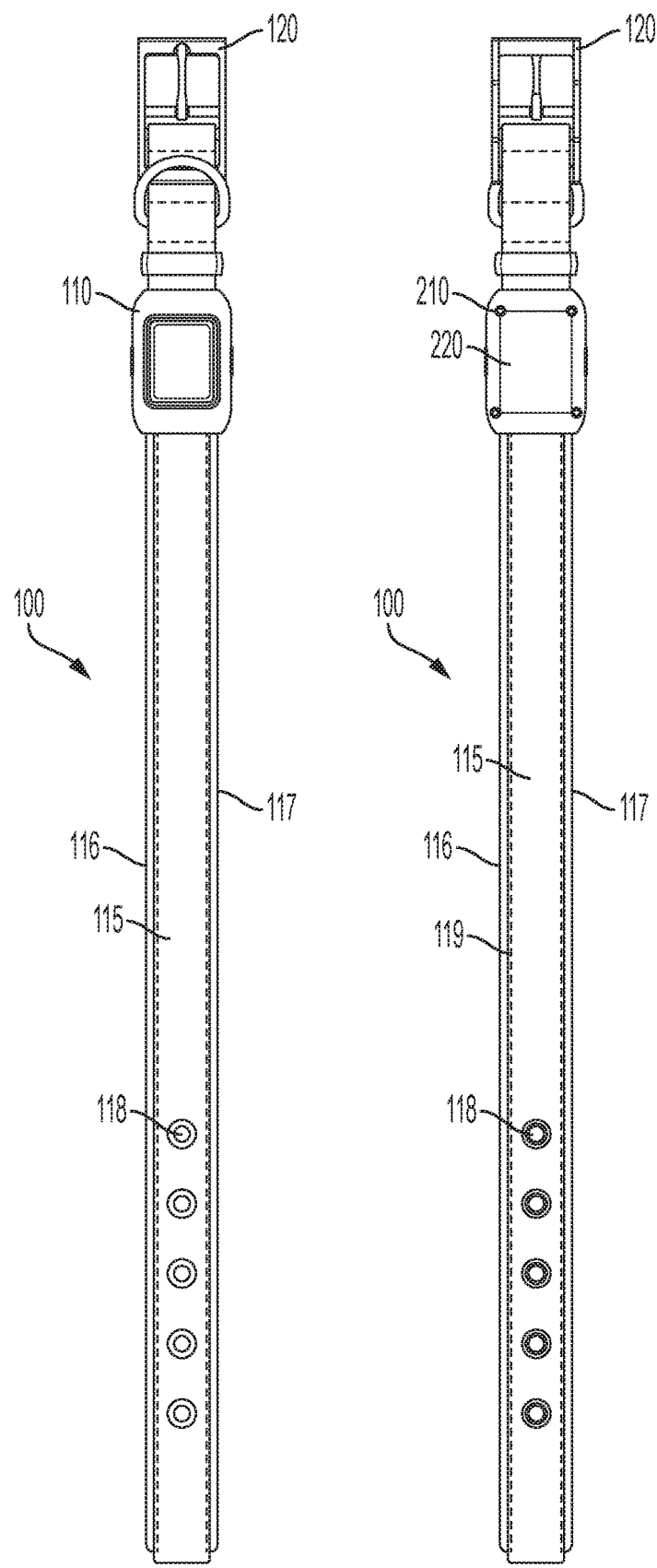
FIG. 2 shows top view of lighted animal restraint of FIG. 1.
FIG. 3 shows a bottom view of lighted animal restraint of FIG. 1.
Figure 4:
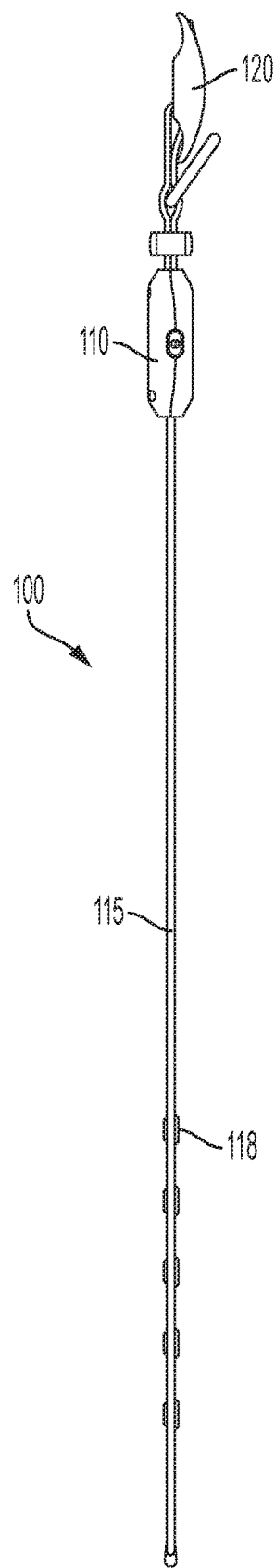
FIG. 4 shows a left side view of lighted animal restraint of FIG. 1.
Figure 5:
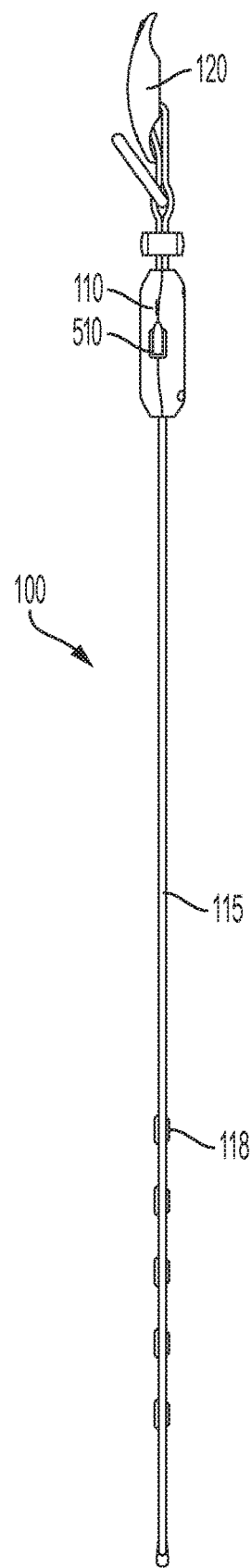
FIG. 5 shows a right-side view of lighted animal restraint of FIG. 1.
Figure 6:
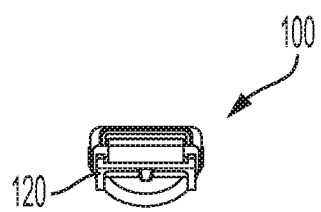
FIG. 6 shows a front view of the lighted animal restraint of FIG. 1.
Figure 7:
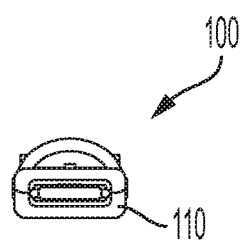
FIG. 7 shows a rear view of the lighted animal restraint of FIG. 1.

FIG. 1 shows one embodiment of a lighted animal restraint 100. Lighted animal restraint 100 includes a lighting module 110. Lighting module 110 houses the battery, circuitry, LEDs and other parts to light the lighted animal restraint 100. An on/off switch 111 is located on the side of lighting module 110, however it may be located other places or the device may include motion activation. Lighted animal restraint 100 includes a collar portion that includes inner webbing 115 and outer webbing 116, 117. Outer webbing 116, 117 has inner webbing 115 sewn into the interior by stitching 119. This creates two pockets in the outer webbing, or "outer webbing pockets" shown at reference characters 116 and 117 respectively. In many embodiments, the outer webbing pockets are translucent. Various colors of webbing may be used to produce different colors of light. It is in these pockets that the fiber optic of the device runs. Additionally, eyelet holes 118 are located in the center of the collar portion. These eyelet holes mate with the prong 121 of buckle 120. Additionally, a loop 124 for capturing excess slack of the collar portion is located near the buckle. The lighted animal restraint 100 also includes a steel loop 123 for attaching dog tags, a leash, or other items. FIG. 2 shows top view of lighted animal restraint 100. In this view the lighting module 110 is further visible. FIG. 3 shows a bottom view of lighted animal restraint 100. In this view the underside of the lighting module 110 is visible. On the underside of the lighting module 110 there is a removable enclosure 220 attached via screws 210. FIG. 4 shows a left side view of lighted animal restraint 100. FIG. 5 shows a right-side view of lighted animal restraint 100. In this view, charging port 510 is visible. This allows for micro USB charging of the device. Other alternative charging systems are possible as well as merely having a removable battery. FIG. 6 shows a front view of the lighted animal restraint 100. FIG. 7 shows a rear view of the lighted animal restraint 100.

Figure 8:
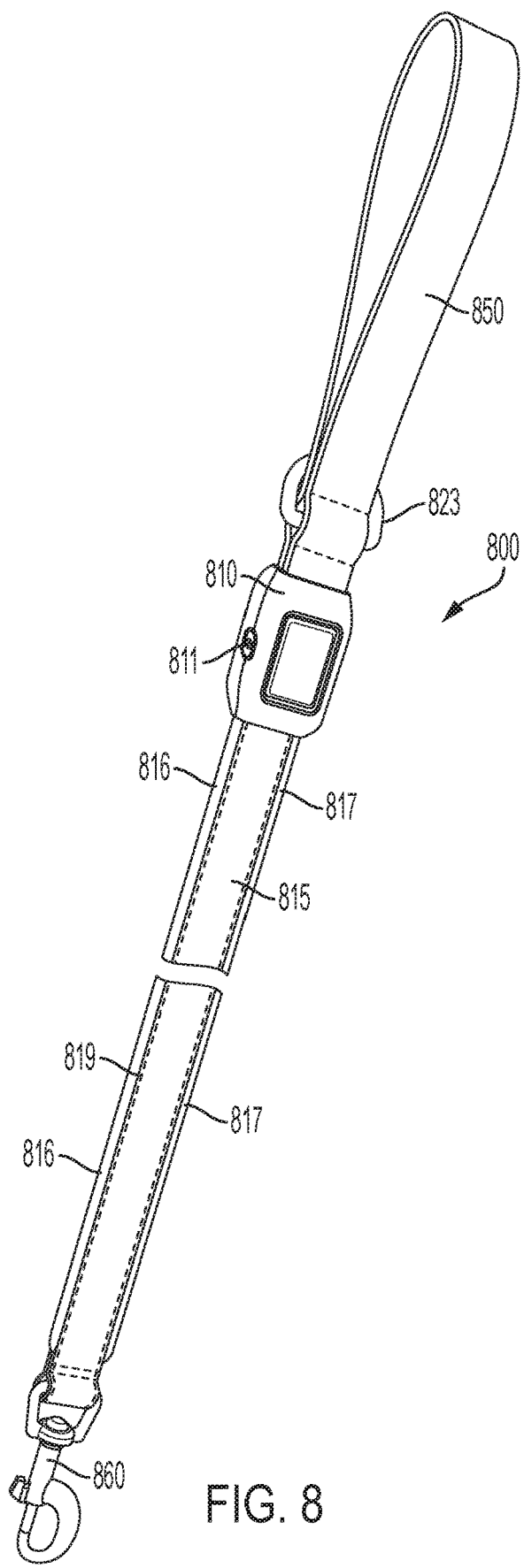
FIG. 8 shows another embodiment of a lighted animal restraint.
Figures 9, 10:
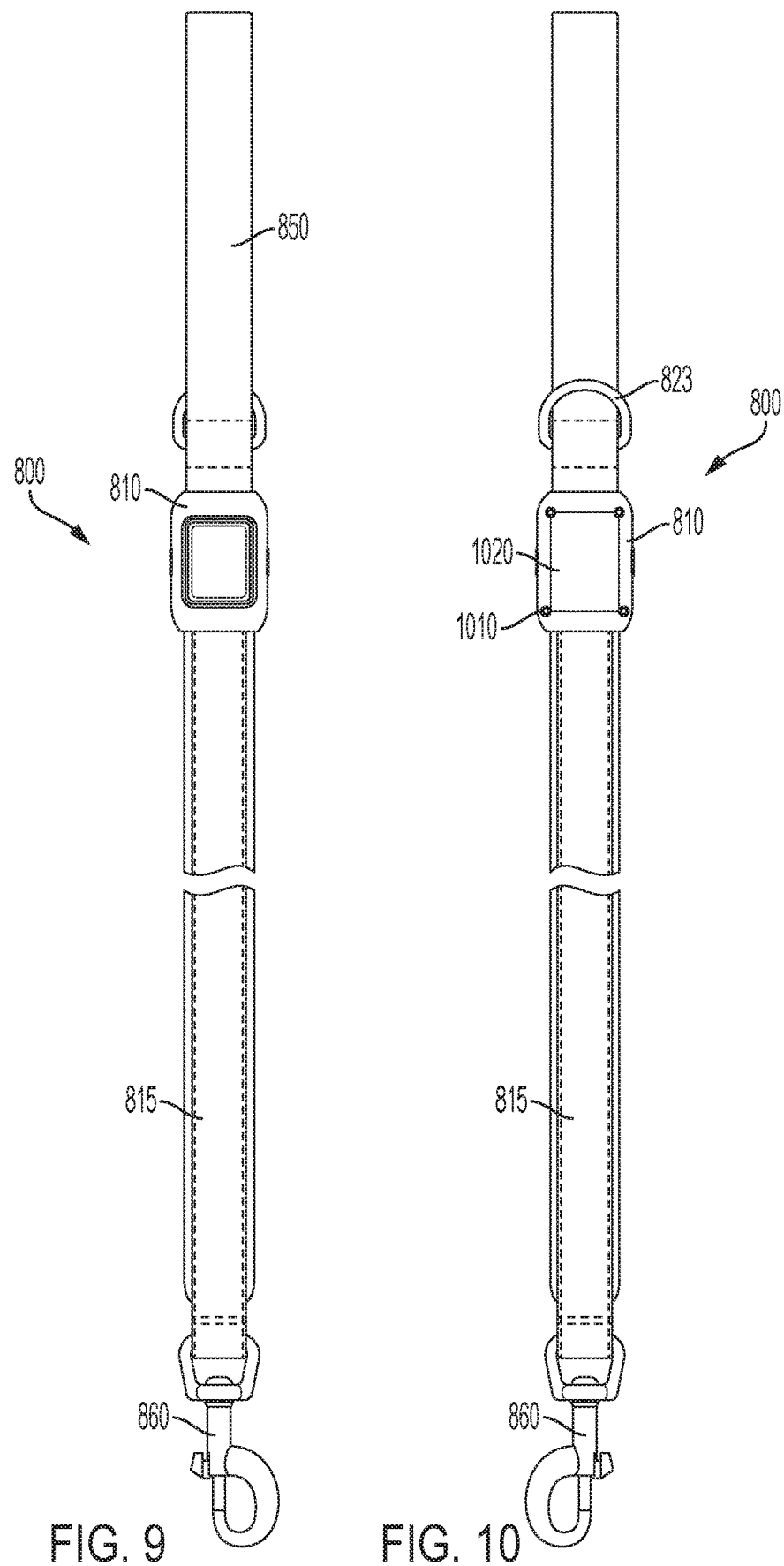
FIG. 9 shows top view of lighted animal restraint of FIG. 8.
FIG. 10 shows a bottom view of lighted animal restraint of FIG. 8.
Figures 11, 12:
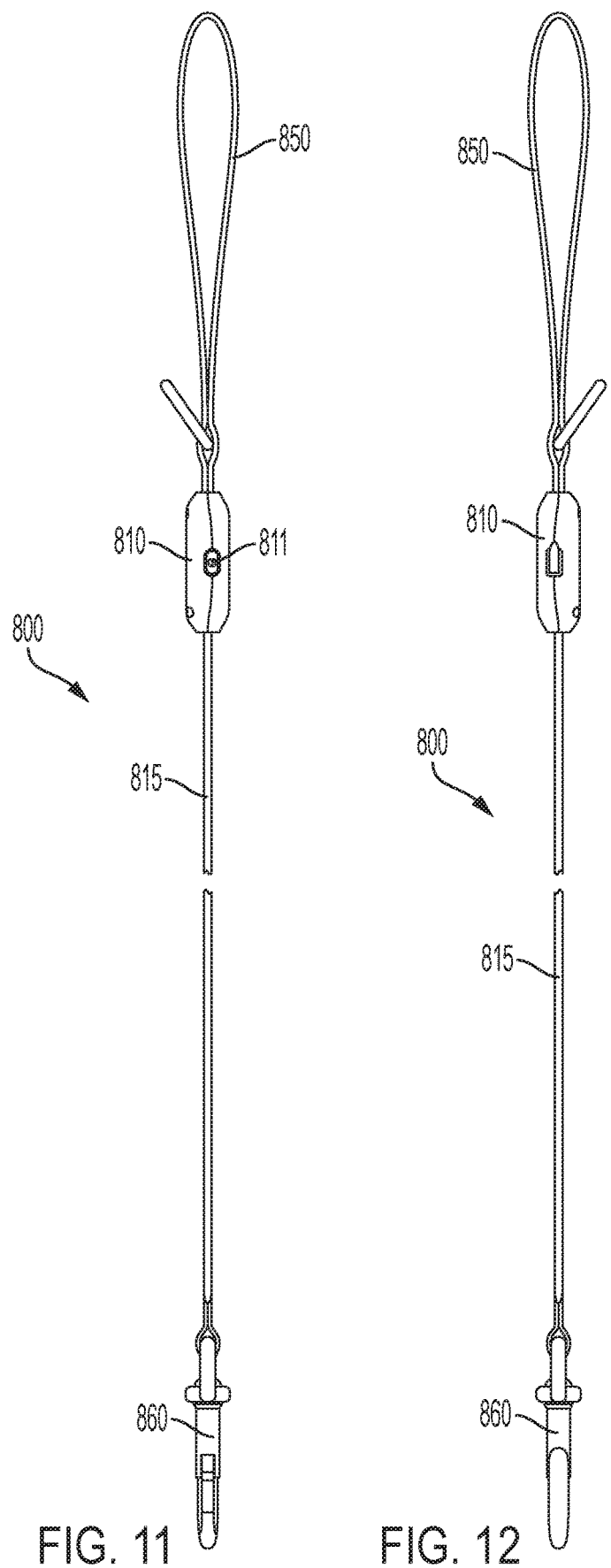
FIG. 11 shows a left side view of lighted animal restraint of FIG. 8.
FIG. 12 shows a right-side view of lighted animal restraint of FIG. 8.
Figure 13:
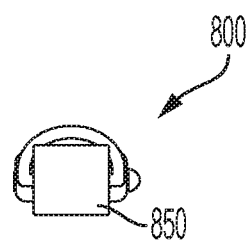
FIG. 13 shows a front view of the lighted animal restraint of FIG. 8.
Figure 14:
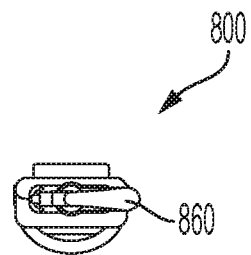
FIG. 14 shows a rear view of the lighted animal restraint of FIG. 8.

FIG. 8 shows another embodiment of a lighted animal restraint 800. Lighted animal restraint 800 includes a lighting module 810. Lighting module 810 houses the battery, circuitry, LEDs and other parts to light the lighted animal restraint 800. An on/off switch 811 is located on the side of lighting module 810, however it may be located other places or the device may include motion activation. Lighted animal restraint 800 includes a leash portion that includes inner webbing 815 and outer webbing 816, 817. Outer webbing 816, 817 has inner webbing 815 sewn into the interior by stitching 819. This creates two pockets in the outer webbing, or "outer webbing pockets" shown at reference characters 816 and 817 respectively. It is in these pockets that the fiber optic of the device runs. The lighted animal restraint 800 also includes a ring 823 for attaching items. The lighted animal restraint 800 also includes a loop 850 and a connector 860. Many different connectors are possible to substitute for connector 860. Additionally, loop 850 may be replaced with a variety of handles or holders. FIG. 9 shows top view of lighted animal restraint 800. In this view the lighting module 810 is further visible. FIG. 10 shows a bottom view of lighted animal restraint 800. In this view the underside of the lighting module 1020 is visible. On the underside of the lighting module 810 there is a removable enclosure 1020 attached via screws 1010. FIG. 11 shows a left side view of lighted animal restraint 800. FIG. 12 shows a right side view of lighted animal restraint 800. In this view, charging port 1210 is visible. This allows for micro USB charging of the device. Other alternative charging systems are possible as well as merely having a removable battery. FIG. 13 shows a front view of the lighted animal restraint 800. FIG. 14 shows a rear view of the lighted animal restraint 800.

Figure 15:
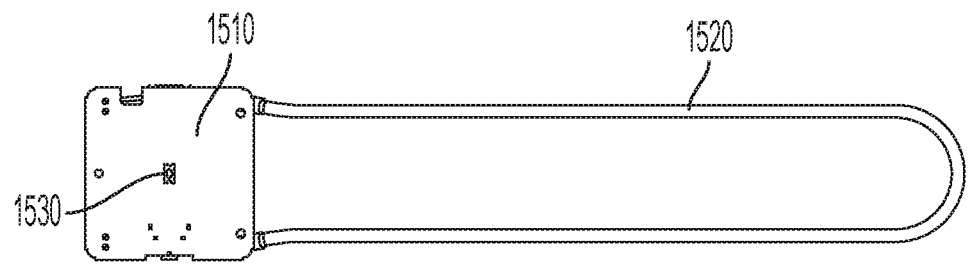
FIG. 15 shows one embodiment of a circuit board and optical fiber combination for use in the lighted animal restraint of FIGS. 1 and 8.
Figure 16:
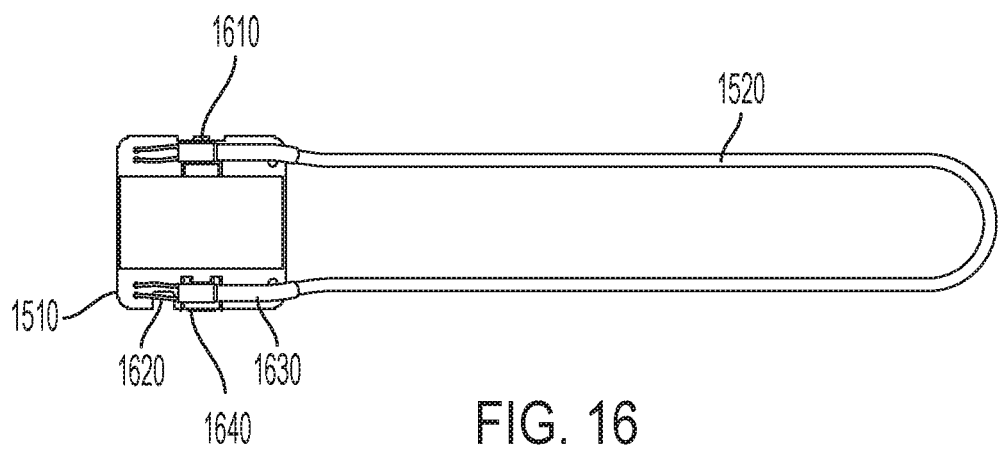
FIG. 16 shows another view of the circuit board and optical fiber combination for use in the lighted animal restraint of FIGS. 1 and 8.
Figure 17:
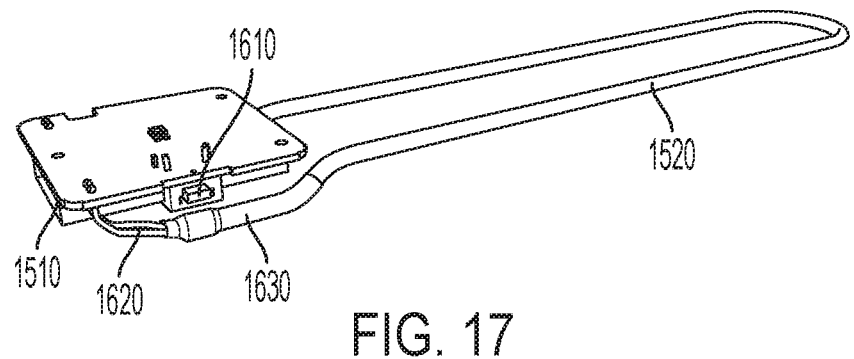
FIG. 17 shows another view of the circuit board and optical fiber combination for use in the lighted animal restraint of FIGS. 1 and 8.

FIG. 15 shows the circuit board 1510 and the various attachments to it. Circuit board 1510 includes circuitry and logic programming to response to a execute activation commands sent to the circuit board 1510 via the external buttons of the device (typically switch 111 or switch 811, in many embodiments). Circuit board 1510 includes a charging indicator 1530 that activates when the device is charging. It is further interconnected with fiber optic 1520. Fiber optics 1520 is typically located in the outer webbing pockets, sandwiched accordingly. Fiber optic 1520 may be of any length according to the desired application. FIG. 16 shows switch 1610 which provides for activation of the device. Various logics may be implemented to provide for the single button control of the device, which in some embodiments, may have multiple modes of operation. Micro-USB connector 1640 allows for the charging of the device. Additionally, LEDs are connected to the circuit board via wires 1620 and tape 1630 in place on fiber optic 1520. In many configurations, this arrangement is important, since the wires 1620 provide for some give in the system, which the fiber optic 1520 is tugged. In FIG. 17, an additional view of circuit board 1510 is visible, showing how wires 1620 allow the LEDs located under tape 1630 to "float." Although not shown, the LEDs are taped directly to the fiber optic 1520. This is in contrast to locating the LED on the circuit board, which typically causes the LED to separate from the fiber optic.

Figure 18:
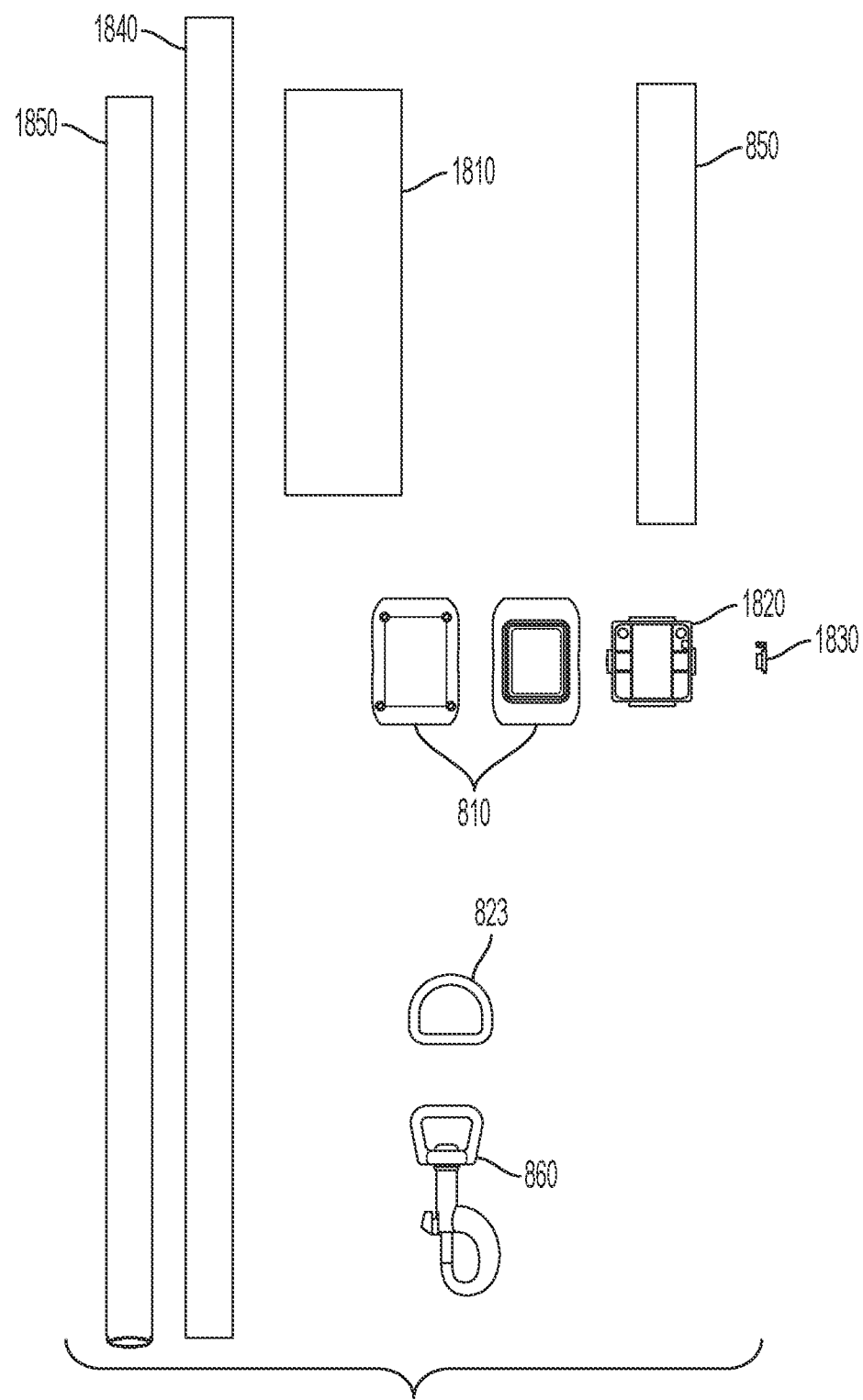
FIG. 18 shows an exploded view of the animal restraint device of FIG. 8.

FIG. 18 shows an exploded view of lighted animal restraint 800. In FIG. 8 the lighted animal restraint shows inner webbing 815 and outer webbing 816, 817. Here the inner webbing 815 is show dissociated with the outer webbing 816, 817. In many embodiments, the outer webbing 1850 (shown as outer webbing 816, 817 in FIG. 8, since the very edges of the webbing are only visible in FIG. 8) is a sleeve that may fit around fiber optic 1520. Subsequently, inner webbing 815 may be sewn onto outer webbing 1850, such that the fiber optic 1520 is trapped on the perimeter of the combination, and the outer webbing 816, 817 is created. There are other methodologies of making the area that the fiber optic 1520 is secured in as well, including having a larger flat strap, in terms of width, for the outer webbing and folding it over and sewing it in order to create the pockets for the fiber optic 1520. The fiber optic 1520 may also be placed in a much narrower webbing tube that only covers the fiber optic and then secured to the inner webbing via sewing, glue, or other attachment method. Additionally, loop 850 is shown in an unfolded configuration. Neoprene 1810 or similar padding material may be sewn into the interior of loop 850 to improve the feel for the user. Lighting module 810 is shown separated into two sections, however, many variations are possible of course. Additionally, an inner frame piece 1820 is shown for supporting the circuit board 1510 and the USB cover 1830. Also shown are connector 860 and ring 823.

Figure 19:
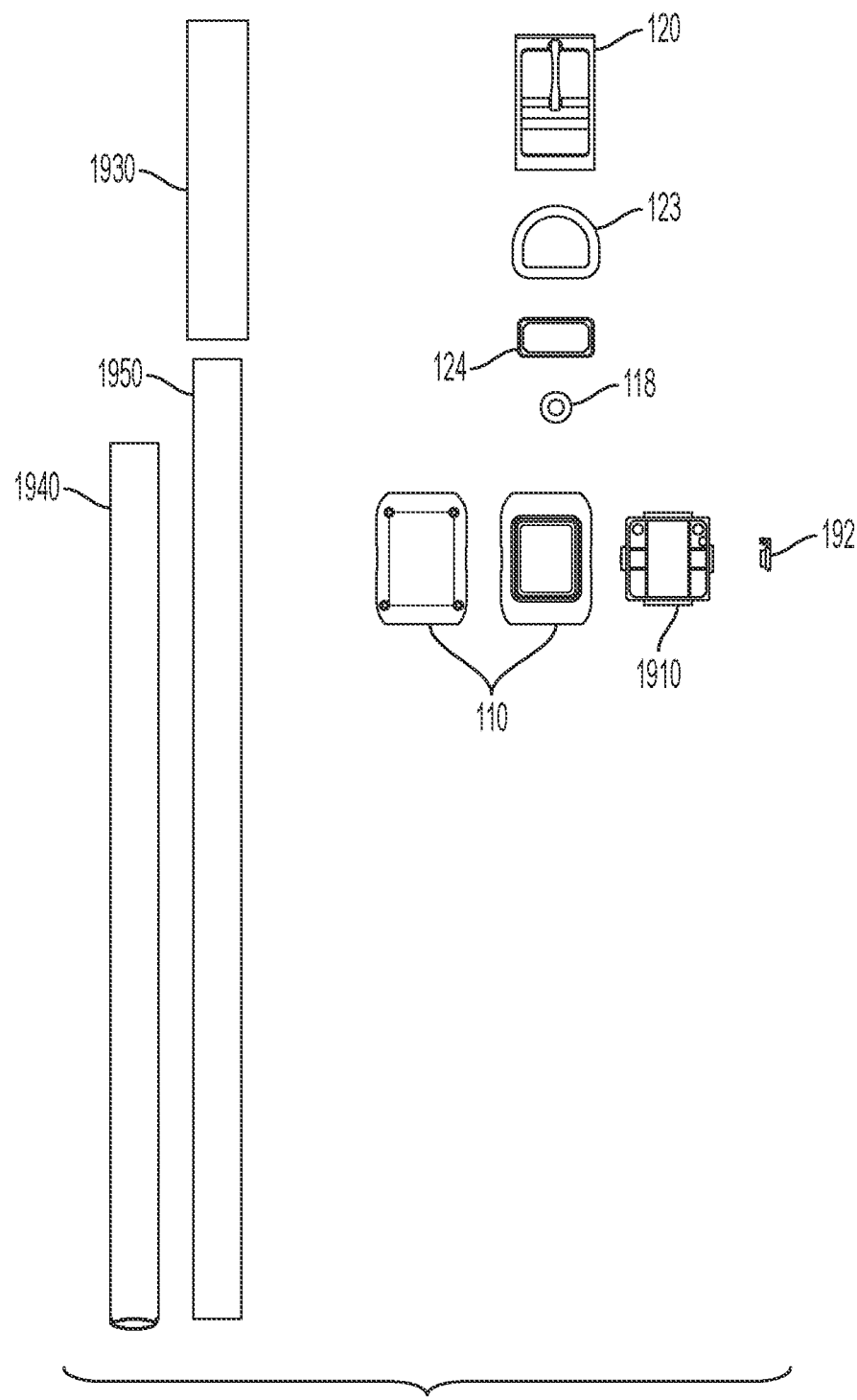
FIG. 19 shows an exploded view of the animal restraint device of FIG. 1.

FIG. 19 shows an exploded view of lighted animal restraint 100. In FIG. 1 the lighted animal restraint shows inner webbing 115 and outer webbing 116, 117. Here the inner webbing 115 is show dissociated with the outer webbing 116, 117. In many embodiments, the outer webbing 1940 (shown as outer webbing 116, 117 in FIG. 1, since the very edges of the webbing are only visible in FIG. 1) is a sleeve that may fit around fiber optic 1520. Similar to above, other methods may be used to cover the fiber optic in webbing. Subsequently, inner webbing 115 may be sewn onto outer webbing 1940, such that the fiber optic 1520 is trapped on the perimeter of the combination, and the outer webbing 116, 117 is created. Additionally, webbing 1930 is shown; webbing 1930 is later mated with buckle 120, ring 123, and loop 124. Lighting module 110 is shown separated into two sections, however, many variations are possible of course. Additionally, an inner frame piece 1920 is shown for supporting the circuit board 1510 and the USB cover 1950.

In many embodiments, a collar or leash is provided that has a fiber optic located in the outer edge of flat strap webbing. The fiber optic is held in place via a central piece of narrower flat strap webbing that is sewn in place. In this way, a flat strap sleeve and a more central piece may be sewn together to form a pocket for the fiber optic to run. Additionally, in many embodiments, the fiber optic has a u-shape and has LEDs located at either tip of the U. Additionally, in many embodiments, the LED is taped directly to the fiber optic and attached to the circuit board via wires, such that the fiber optic may move without detaching from the optical fiber. In many embodiments, a low level of light is dispersed over a wide area of a collar or a leash without a significant number of wires or LEDs. Additionally, the arrangement in many embodiments provides for a durable configuration where LEDs and circuitry are contained within a secure lighting module. Only the fiber optics and flat straps are exposed to the environment. The fiber optics and flat straps are highly resistant to damage and breakage, therefore delivering a durable system. Additionally, in many embodiments all of the components are located in a small central case, typically of plastic, except for the flat straps and fiber optics. In many embodiments, the entire length of the collar or leash is lit, despite a remote LED.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. An animal restraint, the animal restraint comprising:
    a lighting module;
    a fiber optic connected to and receiving light from the lighting module;
    a first pocket, the fiber optic located in the first pocket, the first pocket formed by wrapping a first strap made of webbing around the fiber optic and stitching through a second strap made of webbing and the first strap, such that the fiber optic is in the first pocket formed by the first strap and the second strap is outside of the first strap and light is omitted from the fiber optic through the first strap to light the animal restraint.

2. The animal restraint of claim 1, wherein the animal restraint is a leash or a collar.

3. The animal restraint of claim 1, wherein the first strap is a tube and wherein the second strap is connected to an interior of the first strap along the length of the first strap, such that at least a portion of the fiber optic is positioned within the first pocket and located between the first strap and the connection of the second strap to the first strap.

4. The animal restraint of claim 1, further comprising:
    the second strap stitched to the exterior of the first strap along the length of the first strap to create within the first pocket along a first and second long edge of the first strap.

5. The animal restraint of claim 4, wherein the fiber optic has a u-shape and is aligned along the first and second long edge of the first strap.

6. The animal restraint of claim 5, wherein the fiber optic receives light from the lighting module at both ends of the fiber optic.

7. The animal restraint of claim 6, wherein a first light source is located at a first end of the fiber optic and a second light source is located at a second end of the fiber optic.

8. The animal restraint of claim 7, wherein the first light source and the second light source are LEDs.

9. The animal restraint of claim of claim 8, wherein the first end of the fiber optic is immediately adjacent to the first light source and the first light source and the first end of the fiber optic are connected.

10. The animal restraint of claim 9, wherein the first light source and the first end of the fiber optic are taped together.

11. The animal restraint of claim 10, wherein the first light source is connected to a power source via wires.

12. The animal restraint of claim 10, wherein the first light source is connected to a circuit board via wires.

13. The animal restraint of claim of claim 12 wherein the wires and the first and second light source are located in the lighting module.

14. The animal restraint of claim 13, wherein the lighting module is substantially enclosed.

15. The animal restraint of claim 1, wherein each of the first strap and the second strap is a strap of webbing.

16. An animal restraint, the animal restraint selected from a group consisting of a leash and a collar, the animal restraint comprising:
    a lighting module;
    a circuit board, the circuit board enclosed in the lighting module;
    a first light source connected to the circuit board, such that the first light source does not have a fixed position in relation to the circuit board, the first light source enclosed in the lighting module;

a fiber optic connected to and receiving light from the first light source, the fiber optic at least partially in the lighting module;

a first pocket, the fiber optic located in the first pocket, the first pocket formed by wrapping a first strap made of webbing around the fiber optic and stitching through a second strap made of webbing and the first strap, such that the fiber optic is in the first pocket formed by the first strap and second strap is outside of the first strap and light is omitted from the fiber optic through the first strap to light the animal restraint.

17. The animal restraint of claim 16, wherein the first strap is a tube and the second strap is positioned along the length of the first strap.

18. The animal restraint of claim 17, further comprising:
the second strap stitched to the exterior of the first strap along the length of the first strap to create within the first pocket along the first and second long edge of the first strap.

19. The animal restraint of claim 16, wherein the fiber optic has a u-shape and is aligned along the first and second long edge of the first strap.

20. The animal restraint of claim 16, wherein the fiber optic receives light from the lighting module at both ends of the fiber optic.

21. A method of lighting an animal restraint, the method comprising:
providing an animal restraint, the animal restraint including:
a lighting module;
a circuit board, the circuit board enclosed in the lighting module;
a first light source connected to the circuit board, such that the first light source does not have a fixed position in relation to the circuit board, the first light source enclosed in the lighting module;
a fiber optic connected to and receiving light from the first light source, the fiber optic at least partially in the lighting module;
a first pocket, the fiber optic located in the first pocket, the first pocket formed by wrapping a first strap made of webbing around the fiber optic and stitching through a second strap made of webbing and the first strap, such that the fiber optic is in the first pocket formed by the first strap and second strap is outside of the first strap;
activating the first light source, the second strap separating the first pocket;
transmitting light through the fiber optic; and
emitting light through the first strap.

* * * * *